United States Patent [19]

Li

[11] Patent Number: 5,020,561

[45] Date of Patent: Jun. 4, 1991

[54] DRAG REDUCTION METHOD FOR GAS PIPELINES

[75] Inventor: Ying-Hsiao Li, Plano, Tex.

[73] Assignee: Atlantic Richfield Company, Los Angeles, Calif.

[21] Appl. No.: 566,186

[22] Filed: Aug. 13, 1990

[51] Int. Cl.$^5$ .............................................. F17D 1/16
[52] U.S. Cl. ......................................... 137/13; 252/10
[58] Field of Search ....................... 137/13; 252/10, 11

[56] References Cited

U.S. PATENT DOCUMENTS

| 2,958,205 | 11/1960 | McConkey . | |
|---|---|---|---|
| 3,132,535 | 1/1979 | Rivers et al. . | |
| 3,618,624 | 11/1971 | Valroga . | |
| 3,689,238 | 9/1972 | Stedman . | |
| 3,736,288 | 5/1973 | Stratta et al. . | |
| 3,892,252 | 7/1975 | Poettmann | 137/13 |
| 4,073,983 | 2/1978 | Van Cleave | 137/130 X |
| 4,310,335 | 1/1982 | Arnaudeau . | |
| 4,325,397 | 4/1982 | Lofquist . | |
| 4,325,712 | 4/1982 | Arnaudeau . | |
| 4,527,518 | 7/1985 | Motier . | |

OTHER PUBLICATIONS

Fundamentals of Pipeline Engineering, Vincent-Gerod Gulf Publishing Co., Houston, Tx, 1984, pp. 164 et sec.
"Flow of Natural Gas-"Monograph 9, Bureau of Mines, American Gas Association, N.Y., N.Y., 1956.
"Oil Fogging of Gas, ", Section 9, Chapter 13, Gas Engineering Handbook; 1st edition, 6th printing; Industrial Press, Inc.; N.Y., N.Y., 1965.

Primary Examiner—Alan Cohan
Attorney, Agent, or Firm—Drude Faulconer

[57] ABSTRACT

A method of reducing friction or drag on a gas, e.g. natural gas, flowing in a pipeline wherein a drag reducer is injected into said pipeline to form a thin film on the internal surface or wall of the pipeline. The drag reducer in the present invention is selected from a class of chemical compounds which are comprised of a molecular structure having a polar group at one end thereof which bonds onto said inner wall of the pipeline and a non-polar group at the other which smoothes the gas-solid interface between said wall and said flowing gas thereby reducing gas turbulence at said interface.

4 Claims, 3 Drawing Sheets

DRAG REDUCTION METHOD FOR GAS PIPELINES

DESCRIPTION

1. Technical Field

The present invention relates to a method for reducing drag in gas pipelines and in one of its preferred aspects, relates to a method for adding a drag reducer to a flowing gas pipeline to increase the flow rate therethrough.

2. Background Art

Fluids, such as crude oil and natural gas, are routinely transported through pipelines which may extend over long distances. It is well known that friction or "drag" between the fluids and the pipe wall causes substantial pressure drops along such pipelines as the fluids flow therethrough. To compensate for these pressure losses, pump and/or compressor stations are spaced along the pipeline to boost the pressure of the flowing fluids back to or near their original values in order to keep the fluid flowing at the desired flowrates and to insure that they will ultimately reach their destination.

Due to the high costs associated with installing, maintaining, and operating each booster station, economics dictate that the size and number of such stations for any particular pipeline is limited even though the actual throughput or flowrate may wind up being substantially less than the pipeline could otherwise carry. Since the size and number of booster stations are normally fixed at the time the pipeline is constructed, other techniques have been proposed to increase the maximum flowrate (i.e. volume) of fluids which can be carried through a pipeline at a constant pressure drop in the line.

One such known technique proposed for this purpose involves reducing the friction or drag of the fluids within the pipeline. The term "drag reduction", as recognized in the art, is the increase in the volumetric flowrate of a fluid at a constant pressure drop due to the addition of a material known as a "drag reducer" or "drag reducing agent" to the flowing fluids.

Drag reducers have long been proposed to reduce friction and increase flow in liquid (e.g. crude oil) pipelines, see U.S. Pat. No. 4,527,581 and the good discussion of prior art drag reducers therein, which is incorporated herein by reference. Most known drag reducers used in liquid pipelines are specially-formulated, long-chain polymers which have molecular weights in the range of a million or more; see U.S. Pat. No. 3,736,288. These types of viscoelastic fluids can reduce eddy currents in the liquid stream. This lowering of the friction or drag is generally interpreted to result from a suppression of the turbulent fluctuations by the dissolved polymer molecules of the drag reducer. Consequently, more energy will be conserved in moving the liquid through the pipeline due to the reduction in production rate of turbulent energy.

Studies have also shown that the drag experienced by flowing fluids in a pipeline is directly related to the "roughness" of the inner wall of the pipeline. Roughness is caused by the microscopic and/or larger pits, scratches, and other imperfections in the pipe wall which results during the manufacture of the pipe or from corrosion, abrasion, etc. of the pipe during use. It has been found that the rougher the pipe wall, the more friction or drag flowing fluids will encounter in the pipeline.

In gas pipelines, molecules of known liquid drag reducers are too heavy to be suspended in a flowing gas stream to modify the turbulent profile in the gas stream. It is believed that other types of drag reducers, when added to flowing fluids, provide individual molecules which affix to the wall of the pipe to "fill" the pits, etc., thereby smoothing out the roughness of the wall and reducing the drag (friction) between the wall and the fluids.

While substantial efforts have been made in reducing drag in liquid pipelines, there appears to have been little work done in the area of reducing drag in gas pipeline. One early known technique to increase flow in gas pipelines involved actually liquefying the gas before it flowing it into the pipeline, see U.S. Pat. No. 2,958,205. Others such techniques involved injecting additives, such as polymers, into the flowing gas stream to control emulsions, hydrates, and corrosion within the pipeline to increase the efficency of the pipeline operation; see FUNDAMENTALS OF PIPELINE ENGINEERING, Vincent-Genod, Gulf Publishing Co., Houston, Tex., 1984, pps. 164 et sec, and U.S. Pat. No. 4,132,535 and the discussion of prior art therein.

The possibility of using drag reducers in gas pipelines was investigated and reported in "Flow of Natural Gas Through Experimental Pipe Lines and Transmission Lines", R. V. Smith et al, Monograph 9, Bureau of Mines, Published by AMERICAN GAS ASSOCIATION, New York, N.Y., 1956. It was found that small amounts of liquid added to a gas in a "rough" pipeline could increase the flow capacity of the pipeline in a particular range of Reynolds numbers. It was surmised that "with a rough internal surface, the drops or ripples in the film of liquid probably dropped into the 'valleys' between the peaks of the roughness elements on the pipeline and created a surface that was smoother than the original surface of the pipeline" (see page 65 of report). However, the report reached the conclusion that the injection of liquids into a gas pipeline would be impractical for other reasons (see page 67 of report).

From the above, it can be seen that a need exists for a method by which the drag can be reduced in gas pipelines so that the gas flowrate at a constant pressure drop can be increased, thereby allowing smaller and/or fewer booster stations to be used along a particular pipeline to move the same volume of gas. One such method is disclosed in copending U.S. patent application Ser. No. 07/471,584, filed Jan. 29, 1990, in which a the rate at which certain drag reducers are injected into a gas pipeline at a first point is adjusted until the gas flowrate at a second point is maximized. The disclosed drag reducers form a thin film on the internal surface of the pipeline to smooth out some of the inherent "roughness" of the pipe wall, thereby reducing the friction between the wall and the flowing gas. The present invention is directed to this other drag reducers of this type.

SUMMARY OF THE INVENTION

The present invention provides a method of reducing friction or drag on a gas, e.g. natural gas, flowing in a pipeline wherein a drag reducer is injected into said pipeline to form a thin film on the internal surface or wall of the pipeline. The drag reducer in the present invention is selected from a class of chemical compounds which are comprised of molecules having a polar group forming one end thereof which bonds onto said inner wall of the pipeline and a non-polar group which smoothes the gas-solid interface between said wall and said flowing gas thereby reducing gas turbulence at said interface.

Compounds in the present class of drag reducers are certain natural crudes and commercially-available compounds such as certain corrosion inhibitors. Crudes which can be used are those which contain asphaltenes and long-chain hydrocarbons. The asphaltenes contain polar compounds in their structure while the long-chain hydrocarbon having a molecular weight of from about 300 to about 900 forms the non-polar group. The commercial corrosion inhibitors are fatty acid and/or oxylated fatty acid amines and/or amides. The amine or the amide functional group is the polar part to the molecule. The fatty acid portion having a carbon number of about 18 to about 54 serves as the non-polar part of the molecule.

BRIEF DESCRIPTION OF THE DRAWINGS

The present invention will be better understood by referring to the drawing in which.

BEST KNOWN MODE FOR CARRYING OUT THE INVENTION

Figure 1:
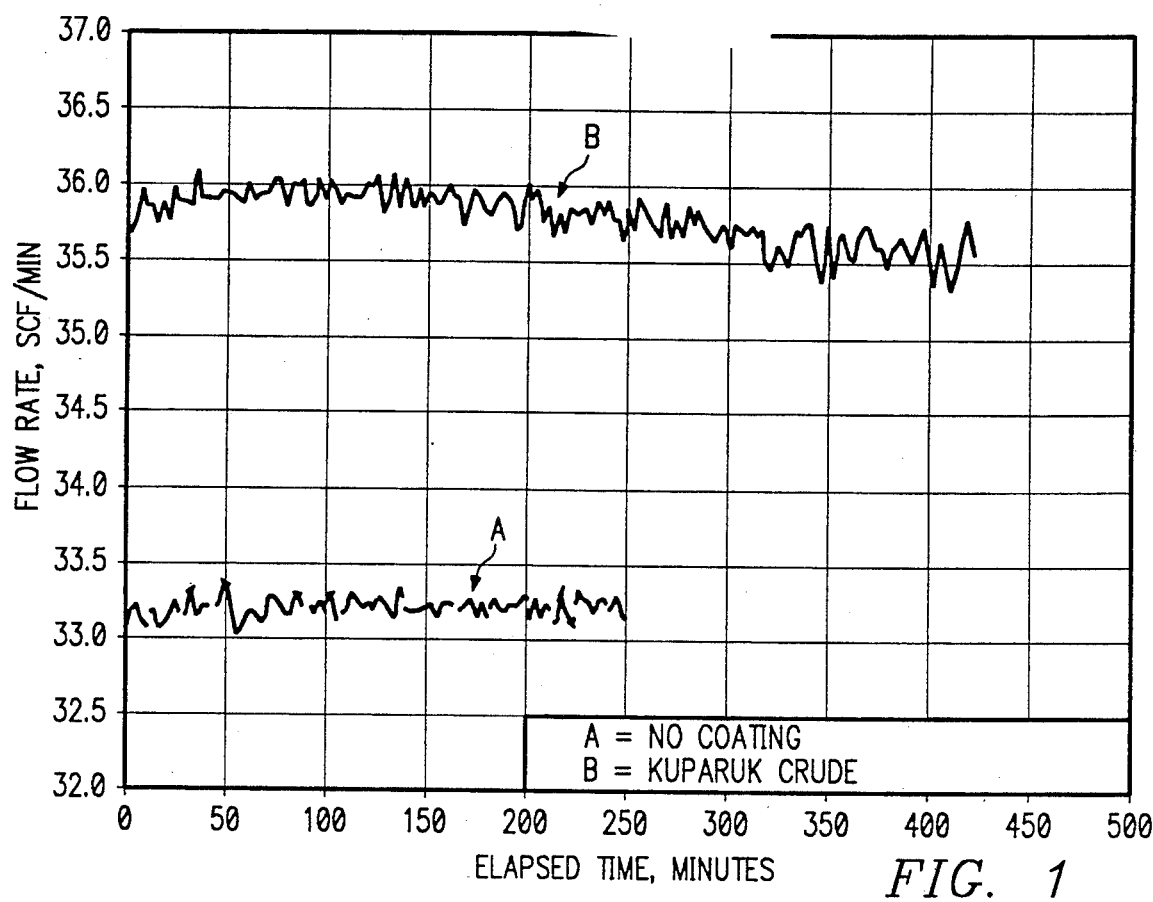
FIG. 1 is a graph representing the results of a gas flow test wherein Kuparuk crude oil was added as the drag reducer.

In accordance with the present invention, a method is provided for reducing the friction or drag on a gas flowing through a pipeline by injecting into the pipeline a drag reducer which is selected from a specific class of chemical compounds. The present drag reducers will form a thin chemical coating on the inner surface of wall of the pipe thereby reducing the friction between the flowing gas and the pipe wall (i.e. gas-solid interface).

Drag reducers of the present selected class are chemical compounds which have molecules which, in turn, have a polar group (amine or amide functional group) on one end and a non-polar group (e.g. long-chain hydrocarbon having a molecular weight of from about 300 to about 900) on the other end. The polar group serves to strongly bond the molecule to the metal pipe wall while the non-polar group, which contacts the flowing gas provides a compliant or lubricating surface to mitigate gas turbulence at the gas-solid interface. The drag reducers in this selected class have properties similar to corrosion inhibitors, lubricants, and/or a combination of both.

More specifically, certain crude oils are available which naturally fall into this class of drag reducers. Such natural crudes are those which are comprised of asphaltenes, resins, and long-chain paraffins. These oils include a wide spectrum of hydrocarbons ranging from $C_1$ (methane) to $C_{40}$. They also contain small amounts of impurities, such as nitrogen, sulfur, oxygen, iron, and vanadium. These impurities mostly concentrate into a high molecular weight fraction, such as asphaltenes, which makes them polar compounds. These polar compounds in crude behave basically the same as do the amine or amide functional groups in certain corrosion inhibitors and will function to bond the drag reducer onto the pipe surface when it is injected into a pipeline.

To function as a drag reducer in accordance with the present invention, a crude oil should comprise from 2 to 35 percent asphaltenes. The asphaltenes in the crude are huge molecules and tend to agglomerate together. The resins in the crude provides the necessary bridge between the large polar core of the asphaltenes and the surrounding non-polar hydrocarbons (i.e. oil) and stabilize the asphaltene dispersion. The aromatic portion of the resin adsorbs onto the asphaltene surface, while the aliphatic portion projects into the oil phase. The resins and non-polar paraffins in the oil phase have good lubricating properties which serve to smooth out the gas-solid interface and mitigate the turbulence at that surface. Examples of natural crudes known to have these properties are those produced from the Prudhoe Bay (Sadlerochit Formation) field and from the Kuparuk field, both located in state of Alaska.

Certain known chemical compounds which have been used to inhibit corrosion in liquid pipelines also have the properties to function as a drag reducer in accordance with the present invention. For example, fatty acid and/or oxylated fatty acid amines (e.g. $CH_3(CH_2)_2NH_2$) and/or amides (e.g. $CH_3(CH_2)_2CONH_2$) with a carbon number between from about 18 and to about 54 provide such drag reducers. The amine and amide functional groups with positive charges provide a strong bonding to a metal surface. The long-chain hydrocarbon in these corrosion inhibitors serves as the compliant or lubrication surface to mitigate turbulence at the gas phase boundary. The long-chain hydrocarbon has a molecular weight of from about 300 to about 900. Examples of commercially-available corrosion inhibitors which have the properties of the present drag reducers are: VISCO 945, Corrosion Inhibitor, Nalco Chemical Co., Sugar Land, Tex.; OFC C-143, Corrosion Inhibitor, Chemlink Oil Field Chemicals, Sand Springs, Okla.

Figure 2:
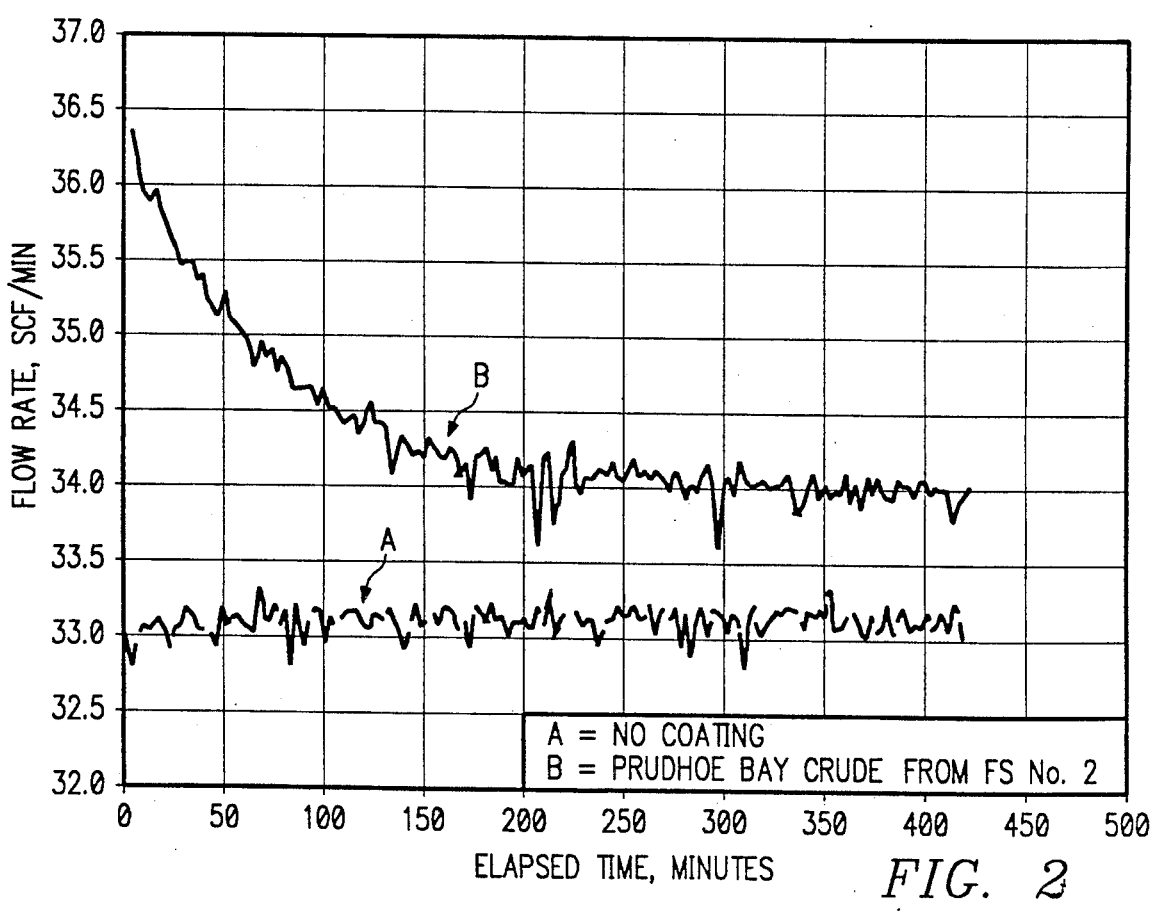
FIG. 2 is a graph representing the results of a gas flow test wherein Prudoe Bay crude oil was added as the drag reducer.
Figure 5:
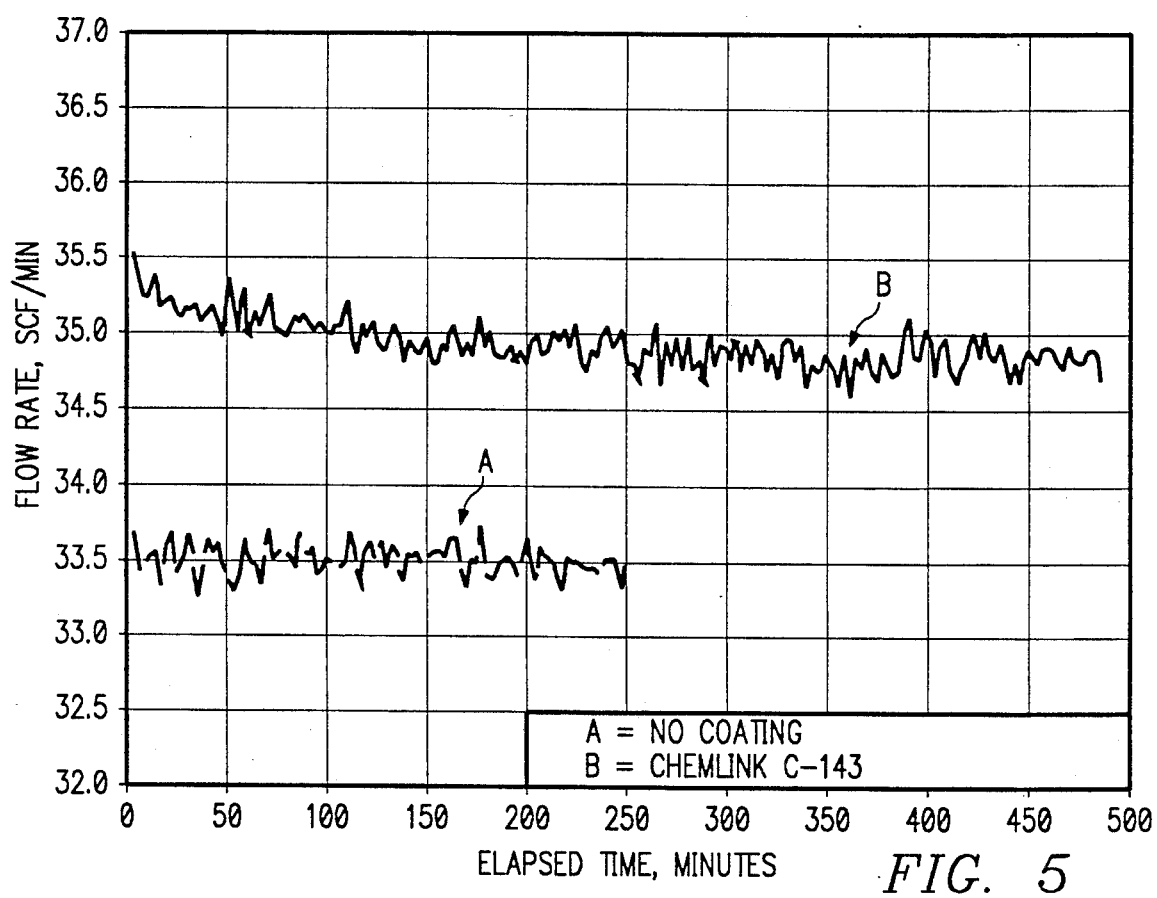
FIG. 5 is a graph representing the results of a gas flow test wherein another commercial corrosion inhibitor (CHEMLINK C-143) was added as the drag reducer.
Figure 3:
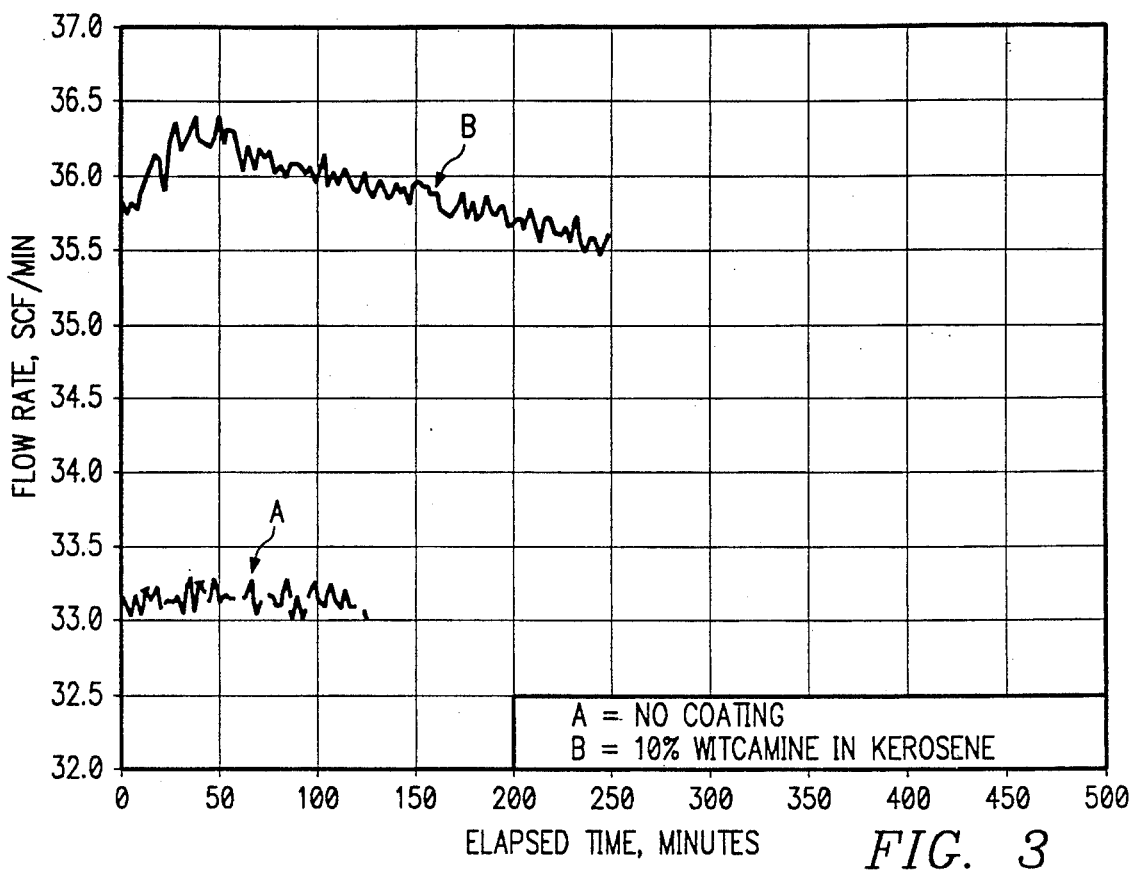
FIG. 3 is a graph representing the results of a gas flow test wherein a commercial compound (Witcamine) was added as the drag reducer.
Figure 4:
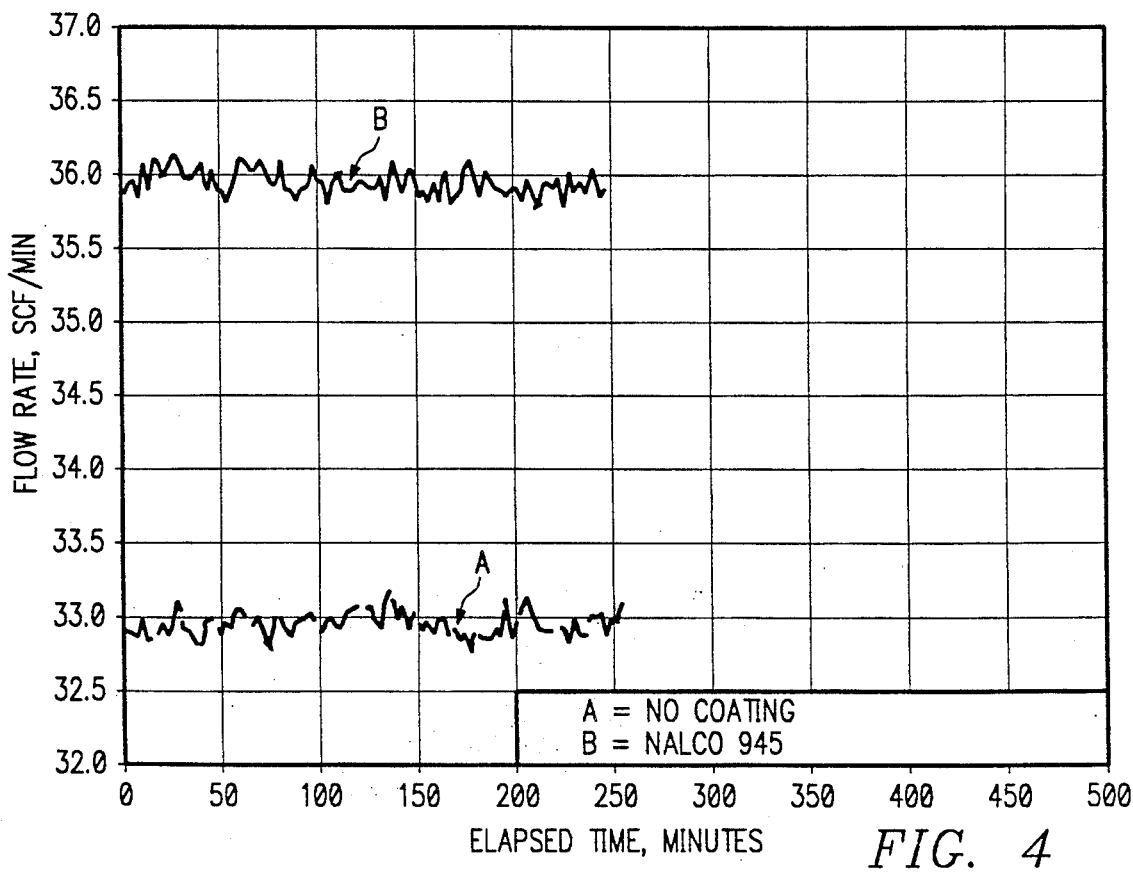
FIG. 4 is a graph representing the results of a gas flow test wherein a commercial corrosion inhibitor (NALCO 945) was added as the drag reducer.

In addition to certain natural crudes and commercially-available corrosion inhibitors, other compounds which have molecules formed of polar and non-polar groups which meet the desired criteria will also function as drag reducers in the present invention. For example, a commercially-available polyoxethylated rosin amine (Witcamine RAD-0515, Witco Corp., Houston, Tex.) when dissolved in kerosene (10% by weight) falls within the selected class of drag reducers FIGS. 1-5 are graphs which represents the results of actual gas flow tests involving five different drag reducers in accordance with the present invention with each specific drag reducer being identified on its respective figure. A gas flow loop of ¼ inch pipe was used for the tests and was constructed to measure flowrate and pressure drop across the a length of the pipe before and after the drag reducer was injected. Compressed air was used as the flowing gas medium. Gas flowrate was directly measured from the loop. It can be seen from the figures that the flowrate of the gas increased substantially (i.e. from 2 to 9 per cent) after a respective drag reducer was added in the loop. The surface roughness before and after the addition of the drag reducer were calculated from the measured flow conditions to illustrate the effectiveness of the drag reducer on flowrate. The calculated surface roughness decreased from 550 microinches without any coating to 420 microinches for a 2 per cent improvement in flowrate and decreased further down with other drag reducers to 200 microinches for a 9 per cent improvement in flowrate.

What is claimed is:

1. A method for reducing drag on a gas flowing in a gas pipeline, said method comprising:

injecting a drag reducer into said gas pipeline wherein said drag reducer is selected from a class of chemical compounds which are comprised of molecules having a polar group forming one end thereof which bonds with said inner wall of said pipeline and a non-polar group forming the other end which smoothes the gas-solid interface between said wall and said flowing gas thereby reducing gas turbulence therebetween wherein said drag reducer is a fatty acid amine and wherein said polar group is comprised of an amine and said non-polar group is comprised of a long-chain hydrocarbon.

2. The method of claim 1 wherein said long-chain hydrocarbon has a carbon number of from about 18 to about 54.

3. The method of claim 1 wherein said long-chain hydrocarbon has a carbon number of from about 18 to about 54.

4. The method of claim 1 wherein said fatty acid amine is an oxylated fatty acid amide.

* * * * *

UNITED STATES PATENT AND TRADEMARK OFFICE
CERTIFICATE OF CORRECTION

PATENT NO. : 5,020,561

DATED : June 4, 1991

INVENTOR(S) : Ying-Hsiao Li

It is certified that error appears in the above-identified patent and that said Letters Patent is hereby corrected as shown below:

Column 6:

In claim 3, line 1, change "1" to --4--.

Signed and Sealed this

Twentieth Day of October, 1992

Attest:

DOUGLAS B. COMER

Attesting Officer      Acting Commissioner of Patents and Trademarks